United States Patent Office 3,389,240
Patented June 18, 1968

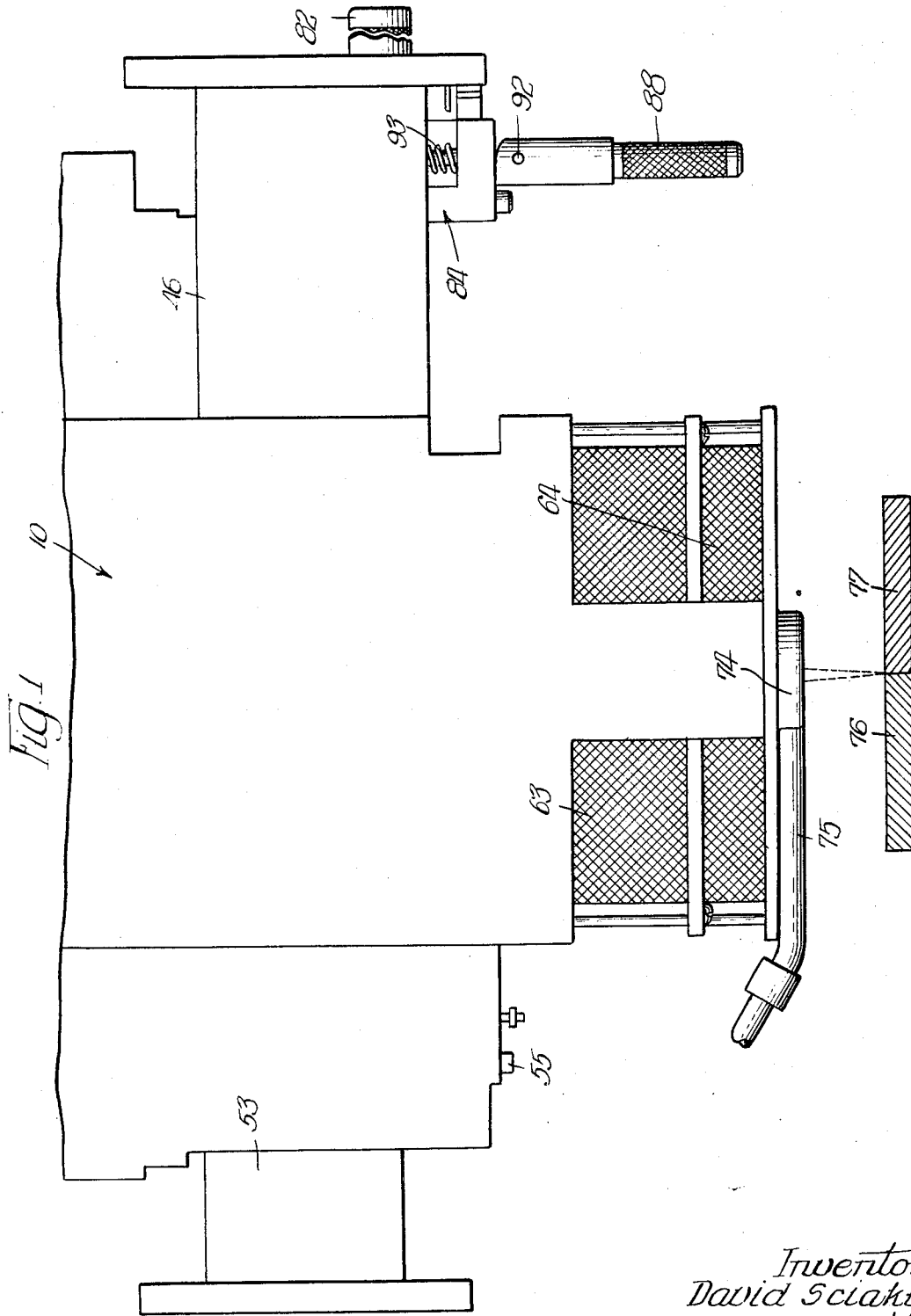

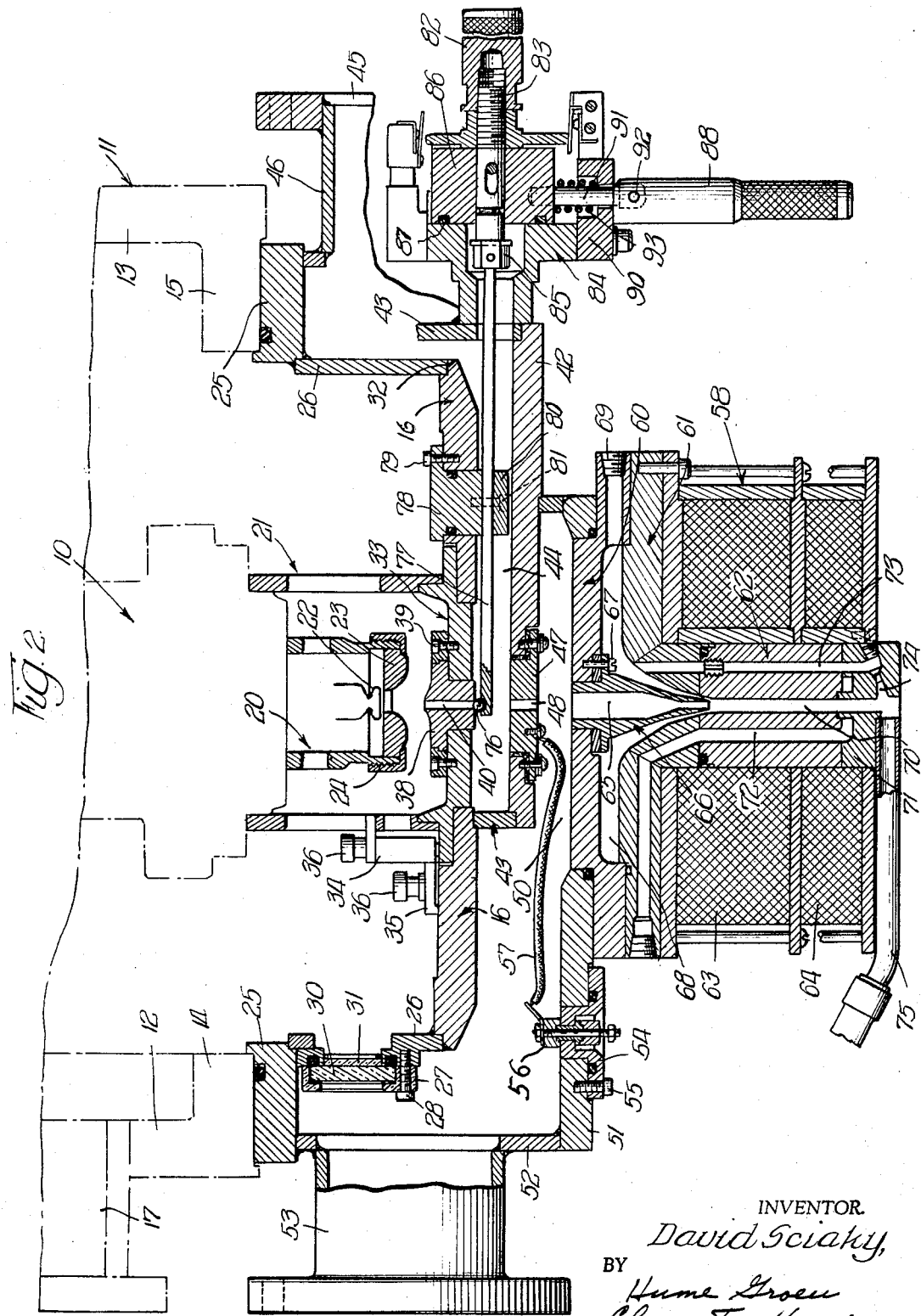

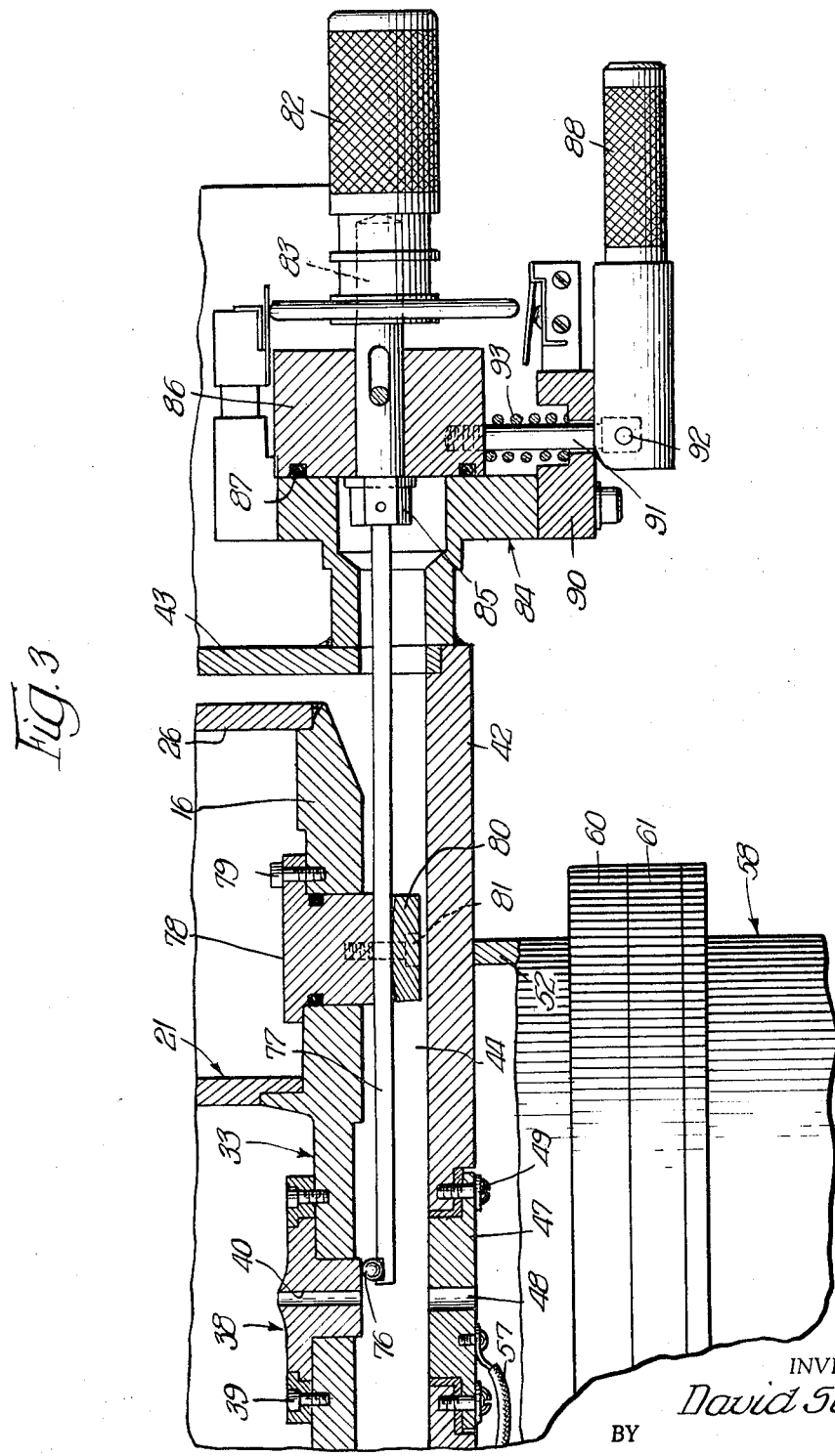

3,389,240
ELECTRON BEAM WELDING APPARATUS
David Sciaky, Chicago, Ill., assignor to Welding Research, Inc., Chicago, Ill., a corporation of Illinois
Filed Sept. 25, 1964, Ser. No. 399,221
11 Claims. (Cl. 219—121)

ABSTRACT OF THE DISCLOSURE

The electron beam welding apparatus of the disclosure is primarily designed for welding in the atmosphere employing venturi means for the purpose and the same also incorporates valve structure in the form of a ball valve for closing the aperture in the anode plate of the electron beam gun. It is possible to actuate the ball valve for closing or opening the aperture from outside the vacuum chamber and additional means are provided for applying resilient pressure to the ball valve when closed to more effectively seal the opening in the anode plate.

---

The invention relates to electron beam welding and has reference in particular to improved apparatus for generating an electron beam within a vacuum chamber and for passing the electron beam as thus generated into the atmosphere for welding workpieces located outside the chamber.

In the electron beam welding process, the beam is generated within a chamber which is maintained at an extremely low pressure of about $1 \times 10^{-5}$ torr, an atmosphere which is equivalent to an inert gas whose impurity level is reduced to one part in 76 million. Considerable pumping is required to maintain the almost perfect vacuum within the chamber and any improvement or other factor which can reduce or lessen the pumping requirements is highly desirable. This is particularly so when the electron beam is generated within a vacuum chamber and then passed into the atmosphere for welding purposes. This is a desirable expedient as regards electron beam welding, since the limitations of chamber size can be overcome.

Several concepts have been advanced for what may be described as electron beam welding out of vacuum. One concept contemplates a series of connecting chambers, each at a progressively higher pressure from the vacuum chamber to the atmosphere. Differential pumping as regards the several chambers is required and it has been found necessary to use extremely small orifices in order that the pumping equipment may be kept to a reasonable size. The small orifices become clogged by the condensed metal vapors which are produced during the process, and as a result the arrangement has been found generally unsatisfactory.

Another concept for projecting an electron beam into the atmosphere and wherein relatively large orifices are possible, is described and claimed in my copending application Ser. No. 374,499, filed June 11, 1964. In the arrangement disclosed in the application the electron beam is generated within a vacuum chamber and the beam is projected into the atmosphere through an orifice of special design. A venturi action is produced at the orifice by the flow of a high pressure inert gas around the same and which is discharged into the atmosphere in the same general direction as the electron beam. By employing venturi action it is possible to project the electron beam from the vacuum chamber into the atmosphere while preventing air and other gases from entering the vacuum chamber. Thus the venturi action assists in maintaining the region within which the beam is generated at a low pressure while permitting the electron beam to pass into the region of higher pressure.

The present invention is concerned with the type of atmospheric welding apparatus which employs venturi action as herein described, the said invention having for its major objective to provide certain improvements whereby the pumping requirements are considerably reduced and whereby a larger diameter orifice through which the beam is projected is made possible.

Another object of the invention is to provide electron beam apparatus employing venturi action for welding out of vacuum and wherein one or more intermediate chambers are interposed between the vacuum chamber and the venturi nozzle with each intermediate chamber having connection with its particular pumping equipment.

Another and more specific object resides in the provision of apparatus of the character described which will employ valve means located within a chamber intermediate the vacuum chamber and the venturi nozzle for sealing the vacuum chamber from the atmosphere during the shut-down period of the apparatus. Accordingly during the shut down period the nearly perfect vacuum within the chamber can be maintained to materially conserve pumping requirements.

Another object is to provide valve means for the electron beam opening of a vacuum chamber, the said valve means being actuated by the operator from the exterior of the vacuum chamber for closing the electron beam opening and whereby special action of the handle when the valve is closed enables the operator to apply sufficient pressure to the valve member to effectively seal the vacuum chamber against the admission of air or other gases.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 1 is a front elevational view showing a preferred form of apparatus for welding out of vacuum and which embodies the improvements of the invention;

FIGURE 2 is a vertical sectional view taken approximately centrally of the apparatus shown in FIGURE 1 and which illustrates details of the present invention; and FIGURE 3 is a fragmentary sectional view on an enlarged scale showing the valve means for the vacuum chamber in open position.

In FIGURE 2 the electron beam gun 10 is shown as located within a vacuum chamber 11 provided by the vertical walls 12 and 13, and by the base or partition wall 16, the said vertical walls having inturned portions 14 and 15 integral therewith. Certain elements are interposed between the inturned portions and the partition wall 16 all of which will be presently described. At this time it is only necessary to understand that the vacuum chamber 11 although having an atmospheric opening can be sealed during the inoperative periods of the electron gun against the entrance of air and other gases, so that the necessary high vacuum can be maintained within the chamber. Suitable pumping equipment is connected with the conduit 17 for evacuating the chamber to thereby produce and maintain the necessary high vacuum during the operating periods of the electron gun.

The electron gun 10 includes the inside cage 20 and the outside cage 21. The electron emitting element or filament 22 is suitably supported within the inside cage by electrodes not shown, and which supply the necessary direct current of the required voltage for energizing the filament. The cathode 23 is suspended from the inside cage, being releasably secured to the cage by the threaded ring 24. The cathode is positioned relatively adjacent the filament so that the latter is substantially located within the center opening formed in the cathode.

The metal ring 25 is suitably secured to the inturned portions 14 and 15 provided by the main vertical walls of the vacuum chamber and the ring in turn supports the partition wall 16 by means of the annular member 26. At the left hand side of the member 26 as shown in FIGURE 2, the member is apertured for receiving the glass retainer 27 which is suitably bolted to the member by bolts such as 28. The retainer provides the glass viewing window 30 which is held in the retainer by means of a suitable gasket and sealed by an O-ring. A leaded glass piece 31 is positioned within the chamber adjacent the glass window 30, and the same is held in place by a suitable retaining ring.

The partition wall 16 is welded at 32 around the periphery of the wall to the depending ring member 26 and the partition wall is apertured centrally thereof for receiving the anode holder 33. The said anode holder has interfitting relation with the outside cage 21 and the holder is clamped to the cage and to the partition wall by the clamps 34 and 35, which are held in place by the thumb nuts 36. The anode 38 is retained and supported by the anode holder 33, being secured thereto by the screws 39. It will also be observed that a central passage 40 is formed in the anode in vertical alignment with the filament for passing the electron beam produced by the filament. This requires that a high voltage direct current be supplied to the elements, with the negative terminal of the high voltage source being connected to the cathode and the positive terminal thereof being connected to the anode.

The base plate 42 and the vertical supporting members 43 for the plate provide an intermediate chamber 44 having location below the anode 38. The chamber 44 is in communication with the conduit 45 formed by the wall 26 and by the tubular member 46. Suitable pumping equipment has connection with the conduit 45 for maintaining the intermediate chamber 44 at the desired low pressure. Since the electron beam from the gun 10 must pass through the plate 42 the said plate is apertured for receiving the insert 47, FIGURES 2 and 3, and which is formed of stainless steel having a central opening or passage 48. The passage 48 is in vertical alignment with passage 40 provided in the anode, and the insert 47 is releasably secured to the base plate by the securing screws 49.

A second intermediate chamber 50 is formed below the chamber 44 by the bottom plate 51 and by the annular member 52. This chamber is also individually evacuated by its particular pumping equipment which is suitably connected to the conduit 53. The metal insert 54 is located in an opening provided therefor in the bottom plate 51 and the insert is secured to the plate by the screws 55. Said insert provides the electrical terminal 56 which is suitably mounted by the insert in an insulated manner. Within the chamber 50 the conductor 57 electrically joins the terminal 56 with the stainless steel insert 47, and thus it is possible to apply to the insert 47 an electrical charge such as will facilitate the passing of the electron beam through the opening 48. For this purpose it will be noted that the insert 47 is suitably insulated from the bottom plate 42.

The bottom plate 51 also provides a supporting element for the venturi unit 58. The unit essentially consists of the top wall 60, the intermediate wall 61, the member 62 and the electric coils 63 and 64 which have surrounding relation with the member 62. The electron beam from the gun 10 is projected through the passages 40 and 48, and then through the passage 65 provided by the inner nozzle 66, the said nozzle being suspended by the screws 67 from the underside of the top wall 60. The outer nozzle is formed by a combination of parts including the intermediate wall 61 and the member 62. The wall 61 for its top portion consists of iron, whereas the lower section thereof and the member 62 is formed of stainless steel or similar non-magnetic material. It will be seen that the wall 61 and the member 62 form a gas passage 68 in surrounding relation with the inner nozzle 66 and which passage is supplied with an inert gas under high pressure by a supply pipe connecting at 69. The passage 68 is continued by the member 62 which provides a vertical connecting passage 70 and which terminates in an outwardly flaring manner in the metal base part 71.

The inner nozzle 66 is gradually reduced in size until the orifice opening provided by the nozzle is reached. In a similar manner the passage 68 is also progressively reduced in size in a direction towards the orifice and thus a restricted and narrow throat area is formed in the region of the orifice. In this region the throat area is a minimum, since beyond the same the passage enlarges. The velocity of the inert gas flowing in the passage 68 is such as to reach the speed of sound in the area of the orifice. Beyond this area the gas velocity increases to a velocity greater than the speed of sound, and thus a venturi action is produced at the orifice of the inner nozzle which draws gas molecules from within the chamber, thus assisting in the evacuation of the chamber. Also, the high pressure inert gas moving at such a high velocity past the orifice and through passage 70 will prevent atmospheric air from entering the vacuum chamber. It has been found that by the use of the gas pump as herein described the required pumping capacity is reduced to one thirty-fourth of what would otherwise be required.

The passage 72 is adapted to carry and circulate a cooling liquid such as water for maintaining the respective parts at a safe low temperature. The member 62 is also provided with the passage 73 for conducting a flow of the high pressure inert gas to the diagonal orifice 74. The gas flow from the orifice 74 is in a direction transversely of the electron beam and towards the conduit 75.

The electron beam as it travels the length of the passage 70 is kept from spreading through normal space charge action and through collision with the gas molecules by means of the magnetic field produced by the electric coil 63. The field developed by the coil 64 focuses the beam to a small spot on the workpieces 96 and 97 as shown in FIGURE 1.

During the shut down periods of the electron beam welding apparatus, it is desirable to maintain the vacuum within the chamber 10 in order to conserve pumping requirements. Accordingly, the invention provides valve means for closing and sealing the passage 40 in the anode 38. The valve means takes the form of a ball 76 carried by an actuating rod 77 having location and extending longitudinally within the intermediate chamber 44. Also, the actuating rod 77 is mounted so as to permit longitudinal movement of the said rod for closing and opening the passage 40. At an intermediate point in the length of the actuating rod the same has contact with a hinge member 78 depending from the partition wall 16 and being secured to the wall by the screws 79. The hinge member includes the cap 80 which is secured thereto by the screws 81, the screws being located on respective sides of the actuating rod so as to permit the rod to be moved longitudinally for the purposes mentioned. This longitudinal movement of the rod is effected by the operator by actuation of the handle 82 which has threaded securement at 83 to the right hand projecting end of the rod. Since the rod extends through an opening in the wall of the vacuum chamber it is necessary to seal the opening to prevent the entrance of air into the intermediate chamber. However, the seal must also permit longitudinal movement of the actuating rod for locating the ball 76 in either a closed or an open position with respect to the passage 40.

The actuating rod 77 extends through an opening in the wall 43 and through the tubular member 84 which is welded to the wall in alignment with the opening. The nut 85 assists in securing the handle 82 to the rod, and beyond this connection the rod passes through and has slidable movement with the slideable member 86. Said member has slidable contact with the outer surface of the tubular member 84, the contacting surfaces being sealed by the O-ring 87. Thus the mounting of the handle 82 and that of the member 86 enables the operator to move the actuating rod 77 in a longitudinal direction and to also move the handle and the right hand end of the rod in an up and down vertical direction. It will be observed that when the passage 40 is closed by the ball 76 that upward pressure for sealing the passage can be applied to the ball by effecting a slidable downward movement of the handle 82 and thus member 86. This is due to the fact that the actuating rod 77 has a hinging action on the cap 80, the effect of which is to yieldingly bias the left end of the actuating rod and thus the ball 76 in an upward direction.

For actuating the slidable member 86 the invention provides a second handle 88 adapted to have contact with wall 90 suitably secured to the tubular member 84. The pin 91 which extends through an opening in the wall 90 is pivotally secured to the handle 88 at 92. However, the opposite end of the pin 91 is fixedly connected to the slidable member 86. A coil spring 93 surrounds the pin 91 and said spring is confined between the wall 90 and the member 86. When the ball 76 is withdrawn from passage 40 as shown in FIGURE 3, by a retracting movement of the handle 82, it will be observed that the second handle 88 is disposed in a horizontal position in which position the slidable member 86 is caused to move upwardly under the tension exerted by the coil spring 93. With the ball valve in this retracted position the welding apparatus is operative for performing a welding operation on the exteriorly located workpieces 76 and 77. Immediately upon terminating the action of the electron gun, the passage 40 is closed by the operator which merely requires actuation of the handle 82 in a direction towards the left, thereby moving the rod 77 longitudinally in the same direction to locate the ball 76 under the passage 40. Resilient pressure is now applied to the ball for effectively sealing the passage by actuation of the handle 88 in a downward direction. With this downward movement of handle 88 the same is positioned vertically as shown in FIGURE 2 and as a result downward movement of the slidable member 86 takes place. This action of the slidable member, since the actuating rod is hinged on the cap 80, imparts upward pressure to the ball valve 76 so that the same effectively seals the passage 40.

The welding apparatus of the invention is characterized by a plurality of chambers located between the electron gun and the inner nozzle member. The electron gun is positioned within the vacuum chamber and the intermediate chambers are located between the same and the atmosphere. Because of the sealing effect of the gas flow it is possible to use a larger diameter orifice connecting the electron gun chamber with the first intermediate chamber and also a larger diameter orifice can be employed for connecting the two intermediate chambers. It will also be understood that the pumping equipment for evacuating the electron gun chamber is separate and independent from the pumping equipment for evacuating the intermediate chambers. In fact for most installations it may be desirable to employ separate and independent pumping equipment for the intermediate chambers. The intermediate chambers will be maintained at a progressively higher pressure from that maintained within the electron gun chamber.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In apparatus for the electron beam welding of a workpiece in the atmosphere, the combination with a vacuum chamber, of an electron beam gun located within the chamber and operative for generating an electron beam, said electron gun having an anode with a passage therein and through which the beam is projected, a nozzle located below the anode in alignment with the passage, said nozzle providing a second passage terminating in an orifice which opens into the atmosphere, a second nozzle in surrounding relation with the first mentioned nozzle and spaced therefrom to provide an annular passage, said annular passage having a cross sectional area of minimum size in advance of the orifice to thus provide a vent opening of the venturi type for the annular passage, means supplying a pressurized gas to the annular passage for discharge from the vent opening, valve means adapted to be manually actuated for either closing or opening the passage in the anode, a handle located exteriorly of the vacuum chamber for actuating the valve means to either close or open the passage in the anode, and additional means operatively associated with the handle for applying resilient pressure to the valve means when the same is closed for more effectively sealing the vacuum chamber.

2. Apparatus for the electron beam welding of a workpiece in the atmosphere as defined by claim 1, wherein the valve means comprises a ball adapted to seat in the exit end of the passage in the anode for closing the said passage, and additionally including an actuating rod which carries the ball at one end thereof and has a handle fixed to its opposite end, said handle being located exteriorly of the vacuum chamber.

3. In apparatus for the electron beam welding of a workpiece in the atmosphere, the combination with a vacuum chamber, of an electron gun located within the chamber and operative for generating an electron beam, said electron gun having an anode with a passage therein, a nozzle located below the anode and providing a passage of gradually reduced cross-sectional area terminating in an orifice of relative small size, said gun and passages being so positioned that the gun projects the electron beam through the passage in the anode, through the passage and orifice provided by the nozzle and then through a second tubular passageway into the atmosphere, said second passageway being formed by an extension of an outer structure surrounding the first mentioned nozzle and spaced therefrom to provide an annular duct, said annular duct having a vent opening adjacent the orifice and said annular duct being gradually reduced and then increased in cross-sectional area ahead of the vent opening to provide a restricted throat, means supplying a gas under pressure to the annular duct and which is discharged from the vent opening and caused to flow through the second passageway into the atmosphere, and valve means adapted to be manually actuated for either closing or opening the passage in the anode, the said passage being closed when the gun is inoperative to thereby maintain the vacuum within the vacuum chamber.

4. Apparatus for the electron beam welding of a workpiece in the atmosphere as defined by claim 3, wherein a handle is provided exteriorly of the vacuum chamber for actuating the valve means to either close or open the passage in the anode, and additionally including means operatively associated with the handle for applying resilient pressure to the valve means when closed for effectively sealing the vacuum chamber.

5. Apparatus for the electron beam welding of a workpiece in the atmosphere as defined by claim 3, wherein the valve means comprises a ball adapted to seat in the exit end of the passage in the anode for closing the said passage, and additionally including an actuating rod which carries the ball at one end thereof and has a handle fixed to its opposite end, said handle being located exteriorly of the vacuum chamber.

6. In electron beam welding apparatus, the combination including a vacuum chamber having a base partition wall, an electron gun located within the vacuum chamber, said electron gun including an anode as an element of the gun and which is mounted in the base partition wall, an intermediate chamber located below the vacuum chamber and having the base partition as one of the walls thereof, said anode having a passage therein and through which an electron beam from the gun is projected, and a valve means located in the intermediate chamber and operable from the exterior of the chamber for closing and opening the passage in the anode.

7. Electron beam welding apparatus as defined by claim 6, wherein the valve means comprises a ball adapted to seat in the exit end of the passage in the anode for closing the passage, an actuating rod located within the intermediate chamber and mounted for longitudinal movement, said actuating rod carrying the said ball at one end and having a handle fixed to its opposite end, and said handle being located exteriorly of the intermediate chamber.

8. Electron beam welding apparatus as defined by claim 6, wherein the valve means comprises a ball adapted to seat in the exit end of the passage in the anode for closing the passage, an actuating rod located within the intermediate chamber and mounted for longitudinal movement, said actuating rod carrying the said ball at one end and having a handle fixed to its opposite end, said handle being located exteriorly of the intermediate chamber, and means for sealing the handle with respect to the intermediate chamber, whereby the handle can be actuated to move the rod longitudinally while preventing the entrance of atmospheric air into the intermediate chamber.

9. In electron beam welding apparatus, the combination including a vacuum chamber having a base partition wall, an electron gun located within the vacuum chamber and operative for producing an electron beam, said gun including an anode as an element thereof and which is mounted in the base partition wall, an intermediate chamber located below the vacuum chamber and having the base partition as one of the walls thereof, said anode having a passage therein and through which the electron beam from the gun is projected, valve means located in the intermediate chamber and operable from the exterior of the chamber for closing and opening the passage in the anode, said valve means including a ball adapted to seat in exit end of the passage in the anode, an actuating rod carrying the ball at one end and having a handle fixed to its opposite end, means mounting the actuating rod for longitudnial movement with the handle being located exteriorly of the intermediate chamber, means sealing the handle with respect to a wall of the intermediate chamber and which provides for limited bodily movement of the handle in a vertical direction, and a hinge member having contact with the actuating rod at an intermediate point in its length, whereby bodily movement of the handle in a vertical direction downwardly will apply yielding pressure to the ball to more effectively seal the passage when the same is closed.

10. Electron beam welding apparatus as defined by claim 9, wherein the hinge member is fixed to the base partition wall so as to depend into the intermediate chamber, and wherein the means sealing the handle with respect to a wall of the intermediate chamber includes a member slidable with respect to said wall in a vertical direction, said handle extending through the slidable member in a manner permitting longitudinal movement of the handle, means sealing the member with respect to said wall and the handle with respect to said member, and a handle member for actuating the slidable member in said vertical direction.

11. In electron beam welding apparatus, the combination including a vacuum chamber having a base partition wall, an electron gun located within the vacuum chamber, said electron gun including an anode as an element of the gun and which is mounted in the base partition wall, a first intermediate chamber located below the vacuum chamber and having the base partition as one of the walls thereof, said anode having a passage through the same and through which an electron beam from the gun is projected, valve means located in the first intermediate chamber and operable from the exterior of the chamber for closing and opening the passage in the anode, a second intermediate chamber located below the first intermediate chamber and including a wall which is common to both chambers, said common wall having a passage therein in alignment with the passage in the anode and through which the electron beam is projected, and an inner nozzle member supported by the bottom wall of the second intermediate chamber, said inner nozzle member providing a passage terminating in an orifice which opens into the atmosphere, and said passage being located in axial alignment with the first mentioned passages so that the electron beam projected by the gun passes through the same into the atmosphere.

References Cited

UNITED STATES PATENTS

| | | | |
|---|---|---|---|
| 904,056 | 11/1908 | Farrell | 251—187 |
| 2,844,706 | 7/1958 | Lorenz | 219—121 |
| 2,981,823 | 4/1961 | Candidus | 219—121 |
| 2,987,610 | 6/1961 | Steigerwald. | |
| 3,136,882 | 6/1964 | Radtke. | |
| 3,156,811 | 11/1964 | Barry | 219—121 |
| 3,162,749 | 12/1964 | Peracchio | 219—121 |
| 3,171,943 | 3/1965 | Niedzielski | 219—121 |
| 3,192,318 | 6/1965 | Schleich et al. | 219—121 |
| 3,219,792 | 11/1965 | Pederson | 219—121 |

RICHARD M. WOOD, *Primary Examiner.*

W. D. BROOKS, *Assistant Examiner.*